(12) United States Patent
Hachikian

(10) Patent No.: US 7,547,373 B2
(45) Date of Patent: Jun. 16, 2009

(54) TWO-PART EPOXY ADHESIVES WITH IMPROVED FLEXIBILITY AND PROCESS FOR MAKING AND USING SAME

(75) Inventor: Zakar Raffi Hachikian, Belmont, MA (US)

(73) Assignee: Illinois Tool Works, Inc., Glenview, IL (US)

(*) Notice: Subject to any disclaimer, the term of this patent is extended or adjusted under 35 U.S.C. 154(b) by 363 days.

(21) Appl. No.: 10/659,805

(22) Filed: Sep. 11, 2003

(65) Prior Publication Data

US 2004/0069405 A1 Apr. 15, 2004

Related U.S. Application Data

(63) Continuation-in-part of application No. 10/269,800, filed on Oct. 14, 2002, now abandoned.

(51) Int. Cl.
C09J 163/00 (2006.01)
C08L 63/00 (2006.01)
B32B 27/38 (2006.01)

(52) U.S. Cl. .................. 156/330; 523/400; 525/523; 525/524; 428/413

(58) Field of Classification Search .............. 523/400, 523/427, 428, 440; 525/523, 524; 428/413, 428/414, 415, 416, 417, 418; 156/330
See application file for complete search history.

(56) References Cited

U.S. PATENT DOCUMENTS

| | | | |
|---|---|---|---|
| 3,853,812 A * | 12/1974 | Helm | 528/120 |
| 3,892,684 A * | 7/1975 | Logan | 528/419 |
| 4,019,388 A | 4/1977 | Hall, II et al. | |
| 4,107,142 A * | 8/1978 | Cunliffe et al. | 528/93 |
| 4,728,384 A | 3/1988 | Goel | |
| 4,762,864 A * | 8/1988 | Goel et al. | 523/428 |
| 4,866,108 A | 9/1989 | Vachon et al. | |
| 4,943,604 A | 7/1990 | Okuri et al. | |
| 5,019,608 A | 5/1991 | Shah | |
| 5,075,034 A * | 12/1991 | Wanthal | 252/511 |
| 5,098,505 A | 3/1992 | Goel et al. | |
| 5,218,063 A | 6/1993 | Kimball | |
| 5,367,006 A | 11/1994 | Hermansen et al. | |
| 5,459,208 A * | 10/1995 | Marten et al. | 525/523 |
| 5,575,956 A | 11/1996 | Hermansen et al. | |
| 5,679,730 A | 10/1997 | Amano et al. | |
| 5,929,141 A | 7/1999 | Lau et al. | |
| 6,060,539 A | 5/2000 | Hermansen et al. | |
| 6,069,023 A | 5/2000 | Bernier et al. | |
| 6,108,210 A | 8/2000 | Chung | |
| 6,248,204 B1 * | 6/2001 | Schuft | 156/305 |
| 6,645,341 B1 * | 11/2003 | Gordon | 156/330 |
| 6,723,803 B1 * | 4/2004 | Hermansen et al. | 525/533 |
| 2004/0197563 A1 * | 10/2004 | Kye | 428/413 |

OTHER PUBLICATIONS

Mr. Sticky's Underwater Glue Press Release, Mr. Sticky International, Internet document, pp. 1-2.
Mr. Sticky's Underwater Glue—Finally! A Glue For Wet Conditions!, Internet document.
Mr. Sticky's Underwater Glue, Glue Testimonials "Tricks of the Trade" Uses, Internet document, pp. 1-4.
Mr. Sticky's Underwater Glue Properties, Internet document, pp. 1-3.
Mr. Sticky's Underwater Glue, Application Instructions, Internet document, pp. 1-2.
Mr. Sticky's Underwater Glue, Epoxy Product Comparison, Internet document, pp. 1-3.
Mr. Sticky's Underwater Glue, Internet document.
Journal of Applied Polymer Science, vol. 26, 1981, "Rubber-Modified Epoxies. II. Morphology and Mechanical Properties" L.T. Manzione et al. pp. 907-919.

* cited by examiner

*Primary Examiner*—Michael J Feely
(74) *Attorney, Agent, or Firm*—Dinsmore & Shohl LLP

(57) ABSTRACT

A two-part epoxy adhesive having a resin component containing a mixture of an epoxy resin and an internally flexibilized epoxy resin and a hardener component containing a mixture of a flexibilizer and an unmodified or modified aliphatic amine, an unmodified or modified polyamide, or combinations thereof. The resin component and hardener component are mixed and applied to substrates, or applied to substrates and mixed, and then allowed to cure yielding a cured epoxy resin having a tensile elongation at room temperature of greater than 30%. The initial curing time is less than 3 hours.

49 Claims, No Drawings

TWO-PART EPOXY ADHESIVES WITH IMPROVED FLEXIBILITY AND PROCESS FOR MAKING AND USING SAME

This application is a continuation-in-part of U.S. application Ser. No. 10/269,800, filed Oct. 14, 2002, now abandoned. The disclosure of which is incorporated herein by reference.

BACKGROUND OF THE INVENTION

This invention relates to two-part epoxy adhesives which have improved flexibility and a process for making and using them. More particularly, this invention relates to an improved epoxy adhesive which has good adhesion to various substrates, especially where a high level of elongation is needed due to thermal expansion and contraction of the substrates or where the substrates are exposed to thermal shock. It can also be used at low operating temperatures.

Polymeric compositions based on the commercially available Bisphenol A based epoxy resins cured by one or more of the active hydrogen compounds, such as polyamines, polyacids, polyphenols, and the like, exhibit good adhesion properties towards various substrates including metal and plastics, but most of these adhesives are rigid, stiff and brittle polymers. There is also a problem of shrinkage occurring in the epoxide adhesive during the curing, thus building undesired stress in the substrates, as well as in the adhesive at the glue line. Accordingly, it has been suggested that flexibilizers such as butadiene rubbers, urethane elastomers, and the like be added to the epoxy resins.

Past attempts to modify epoxies involved reacting them with copolymers of butadiene, acrylonitrile or other "rubber"-based compositions. See Journal of Applied Polymer Science, Vol. 26, pp. 907-919 (1981). By reacting an epoxy with those compounds and then processing the modified composition to induce in situ phase separation, "rubber rich" domains within the epoxy composition are created. Those domains improve the toughness of the cured epoxy matrix once it is formed. However, while such modified epoxy compositions are tougher and less brittle at room temperature, improvements at lower temperatures prove to be, at best, marginal. Further, using the above-mentioned rubber-based material incurs processing problems due to an increase in viscosity of the adhesive mixture.

Accordingly, various epoxy adhesive formulations have been proposed to address these problems. See, for example U.S. Pat. Nos. 4,728,384; 5,098,505; 5,218,063; 5,367,006 and 5,679,730. More recently, there has been introduced Mr. Sticky's Underwater Glue. According to the website at underwaterglue.com, this is an improved two-part epoxy glue having a flexibility (elongation) of 30%, very good shock dampening, and flexible bonds. It has a mixture working life of 30-60 minutes and an initial curing time of 3-4 hours. The complete curing time is 24 hours.

Still, there is a need for an even more improved two-part epoxy adhesive.

SUMMARY OF THE INVENTION

That need is met by the present invention which provides a two-part epoxy adhesive with improved flexibility and provides a process for adhering at least two substrate surfaces to each other with that adhesive.

In one embodiment, the two-part epoxy adhesive has a resin component made up of a mixture of an epoxy resin such as a standard, undiluted, liquid Bisphenol-A resin, and an internally flexibilized epoxy resin which is also preferably a Bisphenol A type resin. The resin component may also contain a plasticizer/accelerator, such as a phenol base plasticizer/accelerator, a coupling agent such as an epoxide functional silane base coupling agent, fillers, such as limestone filler and titanium dioxide white pigment, and a thixotropic agent.

The percentages by weight in the preferred embodiment of the resin component are:
  30-75% epoxy resin,
  5-40% internally flexibilized epoxy resin,
  5-40% plasticizer/accelerator,
  0.1-1% coupling agent,
  11-45% filler, and
  1-8% thixotropic agent.

The two-part epoxy adhesive has a hardener component made up of a mixture of a flexibilizer, such as an amine terminated butadiene acrylonitrile adduct, and an unmodified aliphatic amine, such as an unmodified glycol ether base aliphatic amine, or a modified aliphatic amine, such as an Aminoethyl-piperazine (AEP) base modified amine, or an unmodified or modified polyamide, or combinations thereof. The hardener component may also contain an accelerator, which is preferably a tertiary amine accelerator, as well as a thixotropic agent.

The percentages by weight in the preferred embodiment of the hardener component are:
  20-80% flexibilizer,
  5-30% unmodified aliphatic amine,
  1-10% accelerator,
  10-50% modified aliphatic amine,
  0-15% unmodified or modified polyamide, and
  1-8% thixotropic agent.

The most preferred two-part epoxy adhesive has:
a) a resin component comprising a mixture of:
  40-45% Bisphenol A epoxy resin,
  8-15% internally flexibilized Bisphenol A type epoxy resin,
  10-20% phenol base plasticizer/accelerator,
  0.3-0.6% epoxide functional silane base coupling agent,
  15-25% limestone filler,
  0.5-2% white pigment and
  4-6% thixotropic agent, and
b) a hardener component comprising a mixture of:
  40-45% amine terminated butadiene acrylonitrile adduct,
  7-15% unmodified glycol ether base aliphatic amine,
  5-8% tertiary amine accelerator,
  25-40% AEP base modified amine, and
  1-8% thixotropic agent.

In another embodiment, the two part epoxy adhesive is free of nonylphenol and has a resin component free of nonylphenol made up of a mixture of an epoxy resin such as a standard, undiluted, liquid Bisphenol-A resin, and an internally flexibilized epoxy resin which is also preferably a Bisphenol A type resin. The resin component may also contain a plasticizer/accelerator, such as a phenol base plasticizer/accelerator free of nonylphenol, a coupling agent such as an epoxide functional silane base coupling agent, fillers, such as limestone filler and titanium dioxide white pigment, and a thixotropic agent.

The percentages by weight in the preferred embodiment of the resin component free of nonylphenol are:
  30-75% epoxy resin,
  5-40% internally flexibilized epoxy resin,
  5-40% plasticizer/accelerator free of nonylphenol,
  0.1-1% coupling agent,
  11-45% filler, and
  1-8% thixotropic agent.

The two-part epoxy adhesive free of nonylphenol has a hardener component free of nonylphenol made up of a mixture of a flexibilizer, such as an amine terminated butadiene acrylonitrile adduct; an unmodified aliphatic amine, such as an unmodified glycol ether base aliphatic amine or unmodified AEP aliphatic amine, or a modified aliphatic amine, or an unmodified or modified polyamide, or combinations thereof, and a plasticizer/accelerator free of nonylphenol. The hardener component may also contain an accelerator, which is preferably a tertiary amine accelerator, as well as a thixotropic agent.

The percentages by weight in the preferred embodiment of the hardener component free of nonylphenol are:
30-80% flexibilizer,
5-45% unmodified aliphatic amine,
0-15% modified aliphatic amine,
0-15% unmodified or modified polyamide,
1-10% accelerator,
5-20% plasticizer/accelerator, and
1-8% thixotropic agent.

The most preferred two-part epoxy adhesive free of nonylphenol has:
a) a resin component free of nonylphenol comprising a mixture of:
45-55% Bisphenol A epoxy resin,
8-15% internally flexibilized Bisphenol A type epoxy resin,
10-20% dinonylphenol base plasticizer/accelerator,
0.3-0.6% epoxide functional silane base coupling agent,
15-25% limestone filler,
0.5-2% white pigment and
4-6% thixotropic agent, and
b) a hardener component free of nonylphenol comprising a mixture of:
55-65% amine terminated butadiene acrylonitrile adduct,
7-15% unmodified glycol ether base aliphatic amine,
5-8% modified AEP aliphatic amine,
5-8% tertiary amine accelerator,
8-15% dinonylphenol plasticizer/accelerator, and
4-6% thixotropic agent.

After the resin component and hardener component are mixed and reacted, the cured epoxy adhesive has a tensile elongation at room temperature of greater than 30%. The most preferred embodiment for the adhesive containing nonylphenol has a tensile elongation at room temperature of greater than 120%, while the most preferred embodiment for the adhesive free of nonylphenol has a tensile elongation at room temperature of greater than 80%.

In addition, the reactive mixture of resin component and hardener component has an initial cure time of less than 3 hours, and the most preferred embodiment thereof has an internal cure time of about 1.5-2 hours. The complete cure takes place in approximately 24 hours.

The epoxy adhesive of the present invention has good adhesion to various substrates including concrete, metals, plastics, and wood, and is especially useful in applications where a high level of elongation (for example, when bonding to flexible PVC) is needed due to thermal expansion and contraction of the substrates (for example when bonding metal to plastic) or where the substrates are exposed to thermal shock. It is also useful in applications having low operating temperatures. While the preferred application temperature range is 40-100° F., it may be used at temperatures of up to about 180-200° F. and down to below zero to adhere at least two substrate surfaces to each other by intercalating between those surfaces an adhesive, formed from the reactive mixture of the resin component and the hardener component disclosed above, by applying these components in equal amounts (parts by volume) from a double-barreled cartridge, mixing well until the mixture is relatively homogeneous and applied relatively evenly to the substrates, and then allowing the adhesive to cure.

DETAILED DESCRIPTION OF THE INVENTION

The present invention provides an improved two-part epoxy adhesive having a resin component and a hardener component which can be dispensed from a double-barreled cartridge in equal parts by volume concurrently and then mixed until relatively homogeneous. As is known, dispensing and mixing may be prior to application of the relatively homogeneous mixture to one or more of the substrates, or it may take place on one or more of the substrates. Likewise, a double-barreled cartridge need not be used; the resin component and hardener component can be dispensed from separate containers and then mixed. In any event, the reactive mixture of components is applied relatively evenly between substrates which are joined, and the adhesive is allowed to cure.

The initial cure takes place in less than 3 hours, and, with the two-part epoxy adhesive of the preferred embodiment, it has been found that generally the initial curing time is about 1.5 to 2.0 hours. Complete cure then takes place in about 24 hours.

After cure, the epoxy adhesive of the present invention has a tensile elongation at room temperature of greater than 30%. The most preferred embodiment for the adhesive containing nonylphenol has a tensile elongation at room temperature of greater than 120%, while the most preferred embodiment for the adhesive free of nonylphenol has a tensile elongation at room temperature of greater than 80%. Elongation is important when bonding flexible materials like flexible polyvinyl chloride (PVC) or acrylonitrile-butadiene-styrene (ABS), and in those applications where there is a large amount of displacement between substrates, or where the degree of thermal expansion and contraction is of concern.

The improved flexibility of the two-part epoxy resin of the present invention is achieved by using a resin component and a hardener component having a unique combination of ingredients. The resin component is a mixture of epoxy resin, which may be a standard, undiluted, liquid Bisphenol A resin such as EPON 828 from Shell Oil Company, Houston, Tex., and an internally flexibilized Bisphenol A type epoxy resin such as Araldite PY 322 (a butylated Bisphenol A epoxy resin) available from Ciba Specialty Chemicals, Tarrytown, N.Y. The internally flexibilized epoxy resins have flexible segments in their backbone. Therefore, when they react and become a part of the adhesive network, they provide flexibility into the rigid polymer via their soft/flexible segments. While Bisphenol A type resins are preferred, Bisphenol-F type resins or mixtures of the two can be used as either the core epoxy resin, or the internally flexibilized epoxy resin, or both.

The resin component may also contain a plasticizer/accelerator which may be a phenol based plasticizer/accelerator such as nonylphenol from GE Specialty Chemicals, Morgantown, W. Va. Other plasticizers/accelerators may be used. Nonylphenol is one preferred material since it has minimal effect on physical properties and is a mild accelerator.

A small amount of coupling agent is also preferably added to the resin component. Preferred is an epoxide functional silane base coupling agent such as Silane Z-6040 from Dow Corning Corporation, Midland, Mich. That type of coupling agent, has dual reactivity, meaning that silanes, as is known, possess both organic and inorganic functionality that allow them to react with organic polymers and inorganic surfaces. An amino silane or other types of coupling agents could be used to get the same effect.

Any number of types of fillers can be added to the resin component. Preferred are limestone filler such as Marble White 325 from Filler Products Inc. and Titanium Dioxide R-900 white pigment from DuPont de Nemours, Wilmington, Del. Other white fillers and white pigments may be used for a white or off white colored resin component. If another color is desired, then fillers and pigments of the desired color would be used.

Finally, the resin component can contain a thixotropic agent such as Cab-o-Sil 720 from Cabot Corporation, Boston, Mass. There are numerous other thixotropic agents that could be used along with the fillers to obtain a resin component having the desired viscosity, i.e. one which permits dispensing as discussed above.

In preparation of the resin component, the core epoxy resin (EPON 828), the reactive flexibilizer (Araldite PY 322), the plasticizer/accelerator, and the coupling agent (Silane Z-6040) are mixed until the mixture is relatively homogenous, and then the fillers (Marble White 325 and Titanium Dioxide R-900) are added and mixed. As the last step, the thixotropic agent (Cab-o-Sil 720) is added and mixed until it is dispersed therein.

The preferred weight percentage range of the ingredients in the resin component and the most preferred range are as follows:

| RESIN COMPONENT | Preferred | Most Preferred |
| --- | --- | --- |
| Epoxy Resin | 30-75 | 40-45 |
| Internally Flexibilized Resin | 5-40 | 8-15 |
| Plasticizer/Accelerator | 5-40 | 10-20 |
| Coupling Agent | 0.1-1 | 0.3-0.6 |
| Limestone Filler | 10-40 | 15-25 |
| White Pigment | 1-5 | 0.5-2 |
| Thixotropic Agent | 1-8 | 4-6 |

The hardener component contains a mixture of a flexibilizer, which may be an amine terminated butadiene acrylonitrile adduct, such as Hycor ATBN 1300X16 from B.F. Goodrich, Akron, Ohio, and an unmodified aliphatic amine, such as an unmodified glycol ether base aliphatic amine (i.e. Ancamine 1922A from Air Products, Pittsburgh, Pa.), or a modified base aliphatic amine such as an Aminoethyl-piperazine (AEP) base modified (Ancamine 1767, also from Air Products), or preferably a combination of the two. An unmodified or modified polyamide could also be used, either alone or in combination with an unmodified or modified aliphatic amine. The flexibilizer does not have to be an amine terminated butadiene acrylonitrile (ATBN) but it should be similar in nature. For example, a carboxyl terminated butadiene acrylonitrile (CTBN) can be used. Likewise, unmodified aliphatic amines other than glycol ether based ones can be used as long as they contribute to the toughness, resiliency and shock resistance of the cured adhesive, and modified aliphatic amines other than AEP based ones can be used as long as they contribute to the toughness and speed up the cure, as do the AEP based ones.

The hardener component may also contain an accelerator, which may be a tertiary amine accelerator, such as Ancamine K-54 also from Air Products and a thixotropic agent, which can be the same as the one used in the resin component such as Cab-o-Sil 720 from Cabot. As was the case with the resin component, any thixotropic agent in an amount sufficient to give the desired viscosity may be used.

In preparation of the hardener component, all of the liquids, i.e., everything except the thixotropic agent, are blended, and then the thixotropic agent is added and mixed until well dispersed therein.

The preferred weight percentage range of the ingredients in the hardener component and the most preferred range are as follows:

| HARDENER COMPONENT | Preferred % | Most Preferred % |
| --- | --- | --- |
| Flexibilizer | 20-80 | 40-45 |
| Unmodified Aliphatic Amine | 5-30 | 7-15 |
| Modified Aliphatic Amine | 10-50 | 25-40 |
| Unmodified or Modified Polyamide | 0-15 | 0-10 |
| Accelerator | 1-10 | 5-8 |
| Thixotropic Agent | 1-8 | 5-8 |

In another embodiment, the two-part epoxy adhesive is free of nonylphenol. For this embodiment, the preferred weight percentage range of the ingredients in the resin component, which is free of nonylphenol, and the most preferred range are as follows:

| RESIN COMPONENT | Preferred | Most Preferred |
| --- | --- | --- |
| Epoxy Resin | 30-75 | 45-55 |
| Internally Flexibilized Resin | 5-40 | 8-15 |
| Plasticizer/Accelerator Free of Nonylphenol | 5-40 | 10-20 |
| Coupling Agent | 0.1-1 | 0.3-0.6 |
| Limestone Filler | 10-40 | 15-25 |
| White Pigment | 1-5 | 0.5-2 |
| Thixotropic Agent | 1-8 | 4-6 |

The preferred weight percentage range of the ingredients in the hardener component, which is free of nonylphenol, and the most preferred range are as follows:

| HARDENER COMPONENT | Preferred % | Most Preferred % |
| --- | --- | --- |
| Flexibilizer | 30-80 | 55-65 |
| Unmodified Aliphatic Amine | 5-45 | 10-25 |
| Modified Aliphatic Amine | 0-15 | 0-8 |
| Unmodified or Modified Polyamide | 0-15 | 0-10 |
| Accelerator | 1-10 | 5-8 |
| Plasticizer/Accelerator Free of Nonylphenol | 5-20 | 8-15 |
| Thixotropic Agent | 1-8 | 4-6 |

The same epoxy resins, internally flexibilized resins, coupling agents, fillers, thixotropic agents, flexibilizers, unmodified aliphatic amines, and accelerators described above can be used in this embodiment, except that compounds containing nonylphenol should not be used. For example, the plasticizer/accelerator free of nonylphenol used in the resin and hardener components is desirably dinonylphenol, available from Huntsman, Salt Lake City, Utah. Ancamine 1767, which is an AEP modified base aliphatic amine containing nonylphenol, should not be used. A modified amine which does not contain nonylphenol should be used instead. Unmodified AEP, available from Air Products, can be used as the unmodified aliphatic amine, either alone or in combination with another unmodified aliphatic amine. An unmodified or modified polyamide could also be used, either alone or in combination with an unmodified or modified aliphatic amine.

While two-part epoxy adhesives of the present invention are preferably used at 40-100° F. they may be used at temperatures up to about 180-200° F., and are particularly useful at low temperatures down below about 0° F. They may be used for indoor or outdoor repair situations or in manufacturing OEM products where strong, flexible, but relatively permanent bonds are desired. They have good adhesion to various substrates including concrete, metals, such as steel, aluminum, brass, etc, plastics, such as ABS, PVC, flexible PVC, fiberglass, acrylics, polyurethanes, etc., and wood.

EXAMPLE 1

Example 1 is a formulation containing nonylphenol. The resin component and hardener component were prepared by mixing the following ingredients as described above to prepare the two-part epoxy adhesive of the present invention:

| Tradename | Ingredient | Parts by Weight |
| --- | --- | --- |
| RESIN | | |
| Epon 828 | Bisphenol A Epoxy Resin | 49.5 |
| Araldite PY322 | Internally Flexibilized Bisphenol A Epoxy Resin | 10.0 |
| Nonylphenol | Plasticizer/Accelerator | 16.5 |
| Silene Z-6040 | Coupling Agent | 0.5 |
| Marble White 325 | Limestone Filler | 17.0 |
| Titanium Dioxide R-900 | White Pigment | 1.0 |
| Cab-o-Sil 720 | Thixotropic Agent | 5.5 |
| HARDENER | | |
| Hycar ATBN 1300x-16 | Flexibilizer | 41.7 |
| Ancamine 1922A | Unmodified Aliphatic Amine | 10.6 |
| Ancamine 1767 | Modified Aliphatic Amine | 35.0 |
| Ancamine K-54 | Accelerator | 6.7 |
| Cab-o-Sil 720 | Thixotropic Agent | 6.0 |

The properties of the two-part epoxy adhesive containing nonylphenol were then compared to Mr. Sticky's Underwater Glue with the following results:

| Properties | Mr. Sticky's Underwater Glue (data reported) | Mr. Sticky's Underwater Glue (tested data) | Present Invention (tested data) |
| --- | --- | --- | --- |
| Color | Off-White | Off-White | Off-White |
| Viscosity @ 20° C. | | | |
| Resin | | | 35,000 |
| Hardener | 200,000 | | 36,000 |
| Mixed Viscosity | | | 35,000 |
| Density (gr./cc) | | | |
| Resin | 1.25 | | 1.25 |
| Hardener | 0.94 | | 0.97 |
| Mixing Ratio | | | |
| by weight | 4:3 | | 1.2:1 |
| by volume | 1 to 1 | | 1 to 1 |
| Working Life | 30-60 minutes | | 25-30 minutes |
| Gell Time (25 gram) | 3-4 hours | | 1.5-2 hours |
| Full Cure | 24 hours | | 24 hours |
| Application Temperature | 40°-100° F. | | 40°-100° F. |
| TYPICAL PROPERTIES OF CURED PRODUCT | | | |
| Tensile elongation | 30% | | 125% |
| Tensile Modulus | 76,000 psi | | |
| Tensile Strength | 2,000 psi | | 1,540 psi |
| Flexural Modulus | 82,000 psi | | |
| LAP SHEAR TESTING | | | |
| CRS/CRS @ .010" | 1,800 psi | 1,600 psi | 1,600 psi |
| RIGID PVC/PVC | 1,300 psi | 500 psi | 1,100 psi |
| ABRAIDED RIGID PVC/PVC | 1,800 psi | 850 psi | 1,140 psi |
| ABS/ABS | 400 psi | 400 psi | 800 psi |
| ABRAIDED ABS/ABS | 600 psi | 710 psi | 875 psi |

| Properties | Mr. Sticky's Underwater Glue (data reported) | Mr. Sticky's Underwater Glue (tested data) | Present Invention (tested data) |
|---|---|---|---|
| 180° T-PEEL TESTING | | | |
| RIGID PVC/FLEXIBLE PVC | 12.6 pli | 10.4 pli | 10.5 pli |
| ABRAIDED RIGID PVC/FLEXIBLE PVC | 25.4 pli | 6 pli | 10.1 pli |
| ABS/FLEXIBLE/PVC | 13.0 pli | 3 pli | 10 pli |
| ABRAIDED ABS/FLEXIBLE/PVC | N/A | 11.1 pli | 13.4 pli |

EXAMPLE 2

Example 2 is a formulation free of nonylphenol. The resin component free of nonylphenol and the hardener component free of nonylphenol were prepared by mixing the following ingredients as described above to prepare the two-part epoxy adhesive free of nonylphenol of the present invention:

| Tradename | Ingredient | Parts by Weight |
|---|---|---|
| | RESIN | |
| Epon 828 | Bisphenol A Epoxy Resin | 50 |
| Araldite PY322 | Internally Flexibilized Bisphenol A Epoxy Resin | 10 |
| Dinonylphenol | Plasticizer/Accelerator Free of Nonylphenol | 16 |
| Silene Z-6040 | Coupling Agent | 0.5 |
| Marble White 325 | Limestone Filler | 17 |
| Titanium Dioxide R-900 | White Pigment | 1 |
| Cab-o-Sil 720 | Thixotropic Agent | 5.5 |
| | HARDENER | |
| Hycar ATBN 1300x-16 | Flexibilizer | 60 |
| Ancamine 1922A | Unmodified Aliphatic Amine | 10 |
| AEP | Unmodified Aliphatic Amine | 6 |
| Ancamine K-54 | Accelerator | 7 |
| Dinonylphenol | Plasticizer/Accelerator | 11 |
| Cab-o-Sil 720 | Thixotropic Agent | 6 |

The properties of the two-part epoxy adhesive free of nonylphenol were then compared to Mr. Sticky's Underwater Glue with the following results:

| Properties | Mr. Sticky's Underwater Glue (data reported) | Mr. Sticky's Underwater Glue (tested data) | Present Invention (tested data) |
|---|---|---|---|
| Color | Off-White | Off-White | Off-White |
| Working Life | 30-60 minutes | | 25-30 minutes |
| Gell Time (25 gram) | 3-4 hours | | 1.5-2 hours |
| Full Cure | 24 hours | | 24 hours |
| Application Temperature | 40°-100° F. | | 40°-100° F. |
| TYPICAL PROPERTIES OF CURED PRODUCT | | | |
| Tensile elongation | 30% | | 80% |
| Tensile Modulus | 76,000 psi | | |
| Tensile Strength | 2,000 psi | | 1,300 psi |
| Flexural Modulus | 82,000 psi | | |
| LAP SHEAR TESTING | | | |
| CRS/CRS @ .010" | 1,800 psi | 1,600 psi | 1,900 psi |

| Properties | Mr. Sticky's Underwater Glue (data reported) | Mr. Sticky's Underwater Glue (tested data) | Present Invention (tested data) |
|---|---|---|---|
| RIGID PVC/PVC | 1,300 psi | 500 psi | 800 psi |
| ABRAIDED RIGID PVC/PVC | 1,800 psi | 850 psi | |
| ABS/ABS | 400 psi | 400 psi | 600 psi |
| ABRAIDED ABS/ABS | 600 psi | 710 psi | |
| 180° T-PEEL TESTING | | | |
| RIGID PVC/FLEXIBLE PVC | 12.6 pli | 10.4 pli | 10.5 pli |
| ABRAIDED RIGID PVC/ FLEXIBLE PVC | 25.4 pli | 6 pli | 10.5 pli |
| ABS/FLEXIBLE/PVC | 13.0 pli | 3 pli | 8.7 pli |
| ABRAIDED ABS/FLEXIBLE/ PVC | N/A | 11.1 pli | 12.4 pli |

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A two-part epoxy adhesive comprising:
   a) a resin component comprising a mixture of epoxy resin, and an internally flexibilized epoxy resin, and
   b) a hardener component consisting essentially of a mixture by weight of:
      20-80% flexibilizer, wherein said flexibilizer is selected from amine terminated butadiene acrylonitrile adducts or carboxyl terminated butadiene acrylonitrile adducts,
      5-30% unmodified aliphatic amine, wherein said unmodified aliphatic amine comprises an unmodified glycol ether base aliphatic amine,
      10-50% modified aliphatic amine, wherein said modified aliphatic amine comprises an AEP base modified amine,
      0-15% unmodified or modified polyamide,
      1-10% accelerator, wherein said accelerator comprises a tertiary amine accelerator, and
      optionally 5-20% plasticizer/accelerator that acts as both a plasticizer and an accelerator;
   wherein a reactive mixture of said resin component and said hardener component has an initial cure time of less than 3 hours and a complete cure time of approximately 24 hours;
   wherein after said resin component and said hardener component are mixed and reacted the cured epoxy adhesive has a tensile elongation at room temperature of greater than 30%.

2. The two-part epoxy adhesive of claim 1 wherein said resin component further includes a coupling agent, fillers, a thixotropic agent, and a plasticizer/accelerator that acts as both a plasticizer and an accelerator.

3. The two-part epoxy adhesive of claim 1 wherein said hardener component further includes said plasticizer/accelerator that acts as both a plasticizer and an accelerator, and a thixotropic agent.

4. The two-part epoxy adhesive of claim 1 wherein said resin component comprises by weight:
   30-75% epoxy resin,
   5-40% internally flexibilized epoxy resin,
   5-40% plasticizer/accelerator that acts as both a plasticizer and an accelerator,
   0.1-1% coupling agent,
   11-45% filler, and
   1-8 % thixotropic agent.

5. The two-part epoxy adhesive of claim 4 wherein said epoxy resin is a Bisphenol A epoxy resin, said internally flexibilized epoxy resin is an internally flexibilized Bisphenol A type epoxy resin, said plasticizer/accelerator is a phenol based plasticizer/accelerator, said coupling agent is an epoxide functional silane base coupling agent, and said filler is a mixture of limestone filler and white pigment.

6. The two-part epoxy adhesive of claim 1 wherein after curing the epoxy adhesive has a tensile elongation at room temperature of greater than 120%.

7. The two-part epoxy adhesive of claim 6 comprising:
   a) a resin component comprising a mixture of:
      40-45% Bisphenol A epoxy resin,
      8-15% internally flexibilized Bisphenol A type epoxy resin,
      10-20% phenol based plasticizer/accelerator that acts as both a plasticizer and an accelerator,
      0.3-0.6% epoxide functional silane base coupling agent,
      15-25% limestone filler,
      0.5-2% white pigment, and
      4-6% thixotropic agent, and
   b) a hardener component comprising a mixture of:
      40-45% amine terminated butadiene acrylonitrile adduct,
      7-15% unmodified glycol ether base aliphatic amine,
      5-8% tertiary amine accelerator,
      25-40% AEP base modified amine, and
      1-8% thixotropic agent.

8. The two-part epoxy adhesive of claim 1 wherein the internally flexibilized epoxy resin is selected from internally flexibilized bisphenol A type epoxy resins and internally flexibilized bisphenol F type epoxy resins.

9. The two-part epoxy adhesive of claim 1 wherein the internally flexibilized epoxy resin is a butylated bisphenol A epoxy resin.

10. The two-part epoxy adhesive of claim 1 wherein the flexibilizer is selected from carboxyl terminated butadiene acrylonitrile adducts.

11. The two-part epoxy adhesive of claim 1 wherein the flexibilizer is selected from amine terminated butadiene acrylonitrile adducts.

12. A process of adhering at least two substrate surfaces to each other comprising:

intercalating between said surfaces an adhesive comprising a reactive mixture of:
a) a resin component comprising a mixture of epoxy resin, and internally flexible epoxy resin, and
b) a hardener component consisting essentially of a mixture by weight of:
20-80% flexibilizer, wherein said flexibilizer is selected from amine terminated butadiene acrylonitrile adducts or carboxyl terminated butadiene acrylonitrile adducts,
5-30% unmodified aliphatic amine, wherein said unmodified aliphatic amine comprises an unmodified glycol ether base aliphatic amine,
10-50% modified aliphatic amine, wherein said modified aliphatic amine comprises an AEP base modified amine,
0-15% unmodified or modified polyamide,
1-10% accelerator, wherein said accelerator is a tertiary amine accelerator, and optionally 5-20% plasticizer/accelerator that acts as both a plasticizer and an accelerator; and
allowing said adhesive to cure,
wherein said reactive mixture has an initial cure time of less than 3 hours and a complete cure time of approximately 24 hours; whereby said cured adhesive has a tensile elongation at room temperature of greater than 30%.

13. The process of claim 12 wherein said act of intercalating includes dispensing said resin component and hardener component in equal parts by volume and mixing until the mixture is relatively homogeneous and is applied relatively evenly to the substrates.

14. The process of claim 12 wherein said resin component further includes said plasticizer/accelerator that acts as both a plasticizer and an accelerator, coupling agent, fillers, and a thixotropic agent.

15. The process of claim 12 wherein said hardener component further includes said plasticizer/accelerator that acts as both a plasticizer and an accelerator, and a thixotropic agent.

16. The process of claim 12 wherein said resin component comprises by weight:
30-75% epoxy resin,
5-40% internally flexibilized epoxy resin,
5-40% plasticizer/accelerator that acts as both a plasticizer and an accelerator,
0.1-1% coupling agent,
11-45% filler, and
1-8 % thixotropic agent.

17. The process of claim 16 wherein said epoxy resin is a Bisphenol A epoxy resin, said internally flexibilized epoxy resin is an internally flexibilized Bisphenol A type epoxy resin, said plasticizer/accelerator is a phenol based plasticizer/accelerator, said coupling agent is an epoxide functional silane base coupling agent, and said filler is a mixture of limestone filler and white pigment.

18. The process of claim 12 wherein said hardener component comprises by weight:
20-80% flexibilizer, wherein said flexibilizer is selected from amine terminated butadiene acrylonitrile adducts or carboxyl terminated butadiene acrylonitrile adducts,
5-30% unmodified aliphatic amine, wherein said unmodified aliphatic amine comprises an unmodified glycol ether base aliphatic amine,
1-10% accelerator, wherein said accelerator comprises a tertiary amine accelerator,
10-50% modified aliphatic amine, wherein said modified aliphatic amine comprises an AEP base modified amine, and
1-8% thixotropic agent.

19. The process of claim 18 wherein said flexibilizer is an amine terminated butadiene acrylonitrile adduct, said unmodified aliphatic amine is an unmodified glycol ether base aliphatic amine, said accelerator is a tertiary amine accelerator, and said modified aliphatic amine is an AEP base modified amine.

20. The process of claim 12 wherein:
a) said resin component comprises a mixture of:
40-45% Bisphenol A epoxy resin,
8-15% internally flexibilized Bisphenol A type epoxy resin,
10-20% phenol based plasticizer/accelerator that acts as both a plasticizer and an accelerator,
0.3-0.6% epoxide functional silane base coupling agent,
15-25% limestone filler,
0.5-2% white pigment, and
4-6% thixotropic agent, and
b) said hardener component comprises a mixture of:
40-45% amine terminated butadiene acrylonitrile adduct,
7-15% unmodified glycol ether base aliphatic amine,
5-8% tertiary amine accelerator,
25-40% AEP base modified amine, and
1-8% thixotropic agent.

21. The process of claim 12 wherein the internally flexibilized epoxy resin is selected from internally flexibilized bisphenol A type epoxy resins and internally flexibilized bisphenol F type epoxy resins.

22. The process of claim 12 wherein the internally flexibilized epoxy resin is a butylated bisphenol A epoxy resin.

23. The process of claim 12 wherein the flexibilizer is selected from carboxyl terminated butadiene acrylonitrile adducts.

24. The process of claim 12 wherein the flexibilizer is selected from amine terminated butadiene acrylonitrile adducts.

25. A process for making a two-part epoxy adhesive comprising:
preparing a resin component by mixing an epoxy resin, an internally flexibilized epoxy resin, a plasticizer/accelerator that acts as both a plasticizer and an accelerator, a coupling agent, fillers, and a thixotropic agent, and
preparing a hardener component consisting essentially of a mixture by weight of:
20-80% flexibilizer,
5-45% unmodified aliphatic amine,
0-50% modified aliphatic amine,
0-15% unmodified or modified polyamide,
1-10% accelerator, and
optionally 15-20% plasticizer/accelerator that acts as both a plasticizer and an accelerator;
wherein a reactive mixture of said resin component and said hardener component has an initial cure time of less than 3 hours and a complete cure time of approximately 24 hours.

26. The process of claim 25 wherein said resin component is free of nonylphenol, and said hardener component is free of nonylphenol.

27. The process of claim 26 wherein said plasticizer/accelerator is dinonylphenol.

28. A two-part epoxy adhesive comprising:
a) a resin component comprising a mixture of epoxy resin, and an internally flexibilized epoxy resin, and b) a hardener component consisting essentially of a mixture by weight of:
   30-80% flexibilizer, wherein said flexibilizer is selected from amine terminated butadiene acrylonitrile adducts or carboxyl terminated butadiene acrylonitrile adducts,
   5-45% unmodified aliphatic amine, wherein said unmodified aliphatic amine comprises an unmodified glycol ether base aliphatic amine,
   0-15% modified aliphatic amine, wherein said modified aliphatic amine comprises an AEP base modified amine,
   0-15% unmodified or modified polyamide,
   1-10% accelerator, wherein said accelerator is a tertiary amine accelerator, and
   optionally 5-20% plasticizer/accelerator that acts as both a plasticizer and an accelerator;
wherein a reactive mixture of said resin component and said hardener component has an initial cure time of less than 3 hours and a complete cure time of approximately 24 hours; and
wherein after said resin component and said hardener component are mixed and reacted the cured epoxy adhesive has a tensile elongation at room temperature of greater than 30%, and wherein said resin component is free of nonylphenol and said hardener component is free of nonylphenol.

29. The two-part epoxy adhesive of claim 28 wherein said resin component further includes a coupling agent, fillers, a thixotropic agent, and a plasticizer/accelerator that acts as both a plasticizer and an accelerator wherein said plasticizer/accelerator is free of nonylphenol.

30. The two-part epoxy adhesive of claim 29 wherein said plasticizer/accelerator free of nonylphenol is dinonylphenol.

31. The two-part epoxy adhesive of claim 28 wherein said hardener component further includes said plasticizer/accelerator that acts as both a plasticizer and an accelerator, said plasticizer/accelerator being free of nonylphenol, and a thixotropic agent.

32. The two-part epoxy adhesive of claim 31 wherein said plasticizer/accelerator free of nonylphenol is dinonylphenol.

33. The two-part epoxy adhesive of claim 28 wherein said resin component comprises by weight:
   30-75% epoxy resin,
   5-40% internally flexibilized epoxy resin,
   5-40% plasticizer/accelerator that acts as both a plasticizer and an accelerator wherein
   said plasticizer/accelerator is free of nonylphenol,
   0.1-1% coupling agent,
   11-45% filler, and
   1-8 % thixotropic agent.

34. The two-part epoxy adhesive of claim 33 wherein said plasticizer/accelerator free of nonylphenol is dinonylphenol.

35. The two-part epoxy adhesive of claim 33 wherein said epoxy resin is a Bisphenol A epoxy resin, said internally flexibilized epoxy resin is an internally flexibilized Bisphenol A type epoxy resin, said coupling agent is an epoxide functional silane base coupling agent, and said filler is a mixture of limestone filler and white pigment.

36. The two-part epoxy adhesive of claim 28 wherein said hardener component further includes said plasticizer/accelerator that acts as both a plasticizer and an accelerator, said plasticizer/accelerator being free of nonylphenol, wherein said plasticizer/accelerator free of nonylphenol is dinonylphenol, and a thixotropic agent.

37. The two-part epoxy adhesive of claim 28 wherein said flexibilizer is an amine terminated butadiene acrylonitrile adduct, and said unmodified aliphatic amine is a mixture of an unmodified glycol ether base aliphatic amine and unmodified AEP base aliphatic amine.

38. The two-part epoxy adhesive of claim 28 wherein after curing the epoxy adhesive has a tensile elongation at room temperature of greater than 80%.

39. The two-part epoxy adhesive of claim 38 comprising:
   a) the resin component free of nonylphenol comprising a mixture of:
      45-55% Bisphenol A epoxy resin,
      8-15% internally flexibilized Bisphenol A type epoxy resin,
      10-20% dinonyiphenol plasticizer/accelerator that acts as both a plasticizer and an accelerator,
      0.3-0.6% epoxide functional silane base coupling agent,
      15-25% limestone filler,
      0 5-2% white pigment, and
      4-6% thixotropic agent, and
   b) the hardener component free of nonylphenol comprising a mixture of:
      55-65% amine terminated butadiene acrylonitrile adduct,
      7-15% unmodified glycol ether base aliphatic amine,
      5-8% modified AEP base aliphatic amine,
      5-8% tertiary amine accelerator,
      8-15% dinonylphenol plasticizer/accelerator that acts as both a plasticizer and an accelerator, and
      4-6% thixotropic agent.

40. A process of adhering at least two substrate surfaces to each other comprising:
   intercalating between said surfaces an adhesive comprising a reactive mixture of:
   a) a resin component comprising a mixture of epoxy resin, and internally flexible epoxy resin, and
   b) a hardener component consisting essentially of a mixture by weight of:
      30-80% flexibilizer, wherein said flexibilizer is selected from amine terminated butadiene acrylonitrile adducts or carboxyl terminated butadiene acrylonitrile adducts,
      5-45% unmodified aliphatic amine, wherein said unmodified aliphatic amine comprises an unmodified glycol ether base aliphatic amine,
      0-15% modified aliphatic amine, wherein said modified aliphatic amine comprises an AEP base modified amine,
      0-15% unmodified or modified polyamide,
      1-10% accelerator, wherein said accelerator is a tertiary amine accelerator, and
      optionally 5-20% plasticizer/accelerator that acts as both a plasticizer and an accelerator; and
   allowing said adhesive to cure,
   wherein said reactive mixture has an initial cure time of less than 3 hours and a complete cure time of approximately 24 hours; whereby said cured adhesive has a tensile elongation at room temperature of greater than 30%, and
   wherein said resin component is free of nonylphenol and said hardener component is free of nonylphenol.

41. The process of claim 40 wherein said resin component free of nonylphenol further includes a coupling agent, fillers, a thixotropic agent, and said plasticizer/accelerator that acts as both a plasticizer and an accelerator wherein said plasticizer/accelerator is free of nonylphenol.

42. The process of claim 41 wherein said plasticizer/accelerator free of nonylphenol is dinonylphenol.

43. The process of claim 40 wherein said hardener component free of nonylphenol further includes said plasticizer/accelerator that acts as both a plasticizer and an accelerator, said plasticizer/accelerator being free of nonylphenol, and a thixotropic agent.

44. The process of claim 43 wherein said plasticizer/accelerator free of nonylphenol is dinonylphenol.

45. The process of claim 40 wherein said resin component free of nonylphenol comprises by weight:
- 30-75% epoxy resin,
- 5-40% internally flexibilized epoxy resin,
- 5-40% dinonylphenol plasticizer/accelerator that acts as both a plasticizer and an accelerator,
- 0.1-1% coupling agent,
- 11-45% filler, and
- 1-8% thixotropic agent.

46. The process of claim 45 wherein said epoxy resin is a Bisphenol A epoxy resin, said internally flexibilized epoxy resin is an internally flexibilized Bisphenol A type epoxy resin, said coupling agent is an epoxide functional silane base coupling agent, and said filler is a mixture of limestone filler and white pigment.

47. The process of claim 40 wherein said hardener component free of nonylphenol comprises by weight:
- 8-15% dinonylphenol plasticizer/accelerator, that acts as both a plasticizer and an accelerator, and
- 1-8% thixotropic agent.

48. The process of claim 47 wherein said flexibilizer is an amine terminated butadiene acrylonitrile adduct, and said unmodified aliphatic amine is a mixture of an unmodified glycol ether base aliphatic amine and an unmodified AEP aliphatic amine.

49. The process of claim 40 wherein:
a) said resin component free of nonylphenol comprises a mixture of:
- 45-55% Bisphenol A epoxy resin,
- 8-15% internally flexibilized Bisphenol A type epoxy resin,
- 10-20% dinonylphenol plasticizer/accelerator that acts as both a plasticizer and an accelerator,
- 0.3-0.6% epoxide functional silane base coupling agent,
- 15-25% limestone filler,
- 0.5-2% white pigment and
- 4-6% thixotropic agent, and b) said hardener component free of nonylphenol comprises a mixture of:
- 55-65% amine terminated butadiene acrylonitrile adduct,
- 7-15% unmodified glycol ether base aliphatic amine,
- 5-8% modified AEP base aliphatic amine,
- 5-8% tertiary amine accelerator,
- 8-15% dinonylphenol plasticizer/accelerator that acts as both a plasticizer and an accelerator, and
- 4-6% thixotropic agent.

\* \* \* \* \*

UNITED STATES PATENT AND TRADEMARK OFFICE
CERTIFICATE OF CORRECTION

| | |
|---|---|
| PATENT NO. | : 7,547,373 B2 |
| APPLICATION NO. | : 10/659805 |
| DATED | : June 16, 2009 |
| INVENTOR(S) | : Zakar R. Hachikian |

Page 1 of 1

It is certified that error appears in the above-identified patent and that said Letters Patent is hereby corrected as shown below:

Col 16, Line 17, "0 5-2%" should read as -- 0.5-2% --

Signed and Sealed this

Tenth Day of November, 2009

David J. Kappos
*Director of the United States Patent and Trademark Office*